US005289914A

United States Patent [19]

Holmgren

[11] Patent Number: 5,289,914

[45] Date of Patent: Mar. 1, 1994

[54] SAFETY DEVICE FOR CASSETTES

[75] Inventor: Bertil Holmgren, Vellinge, Sweden

[73] Assignee: M W Trading APS, Glyngore, Denmark

[21] Appl. No.: 720,817

[22] PCT Filed: Dec. 15, 1989

[86] PCT No.: PCT/SE89/00733

§ 371 Date: Jul. 11, 1991

§ 102(e) Date: Jul. 11, 1991

[87] PCT Pub. No.: WO90/07183

PCT Pub. Date: Jun. 28, 1990

[30] Foreign Application Priority Data

Dec. 22, 1988 [SE] Sweden ........................... 8804622-2

[51] Int. Cl.[5] ...................... G11B 33/04; B65D 85/57

[52] U.S. Cl. .................................. 206/1.5; 206/309; 206/387; 206/449; 292/107; 292/209; 312/9.56

[58] Field of Search .............. 292/190, 209, 107, 108, 292/210; 312/9.47, 9.48, 9.53, 9.54, 9.55, 9.56, 9.57, 333, 334.47; 206/309, 387, 444, 493, 1.5

[56] References Cited

U.S. PATENT DOCUMENTS

| | | | |
|---|---|---|---|
| 1,092,651 | 4/1914 | Jordan, Jr. | 312/333 |
| 1,173,399 | 2/1916 | Van Orden | 292/107 |
| 1,255,894 | 2/1918 | Krueger | 312/9.48 |
| 2,557,436 | 6/1951 | Isserstedt | 312/9.56 X |
| 3,677,396 | 7/1972 | Staar | 206/387 |
| 4,046,255 | 9/1977 | Ackeret | 206/387 |
| 4,466,540 | 8/1984 | Lotrous . | |
| 4,641,747 | 2/1987 | Mestdagh et al. | 206/309 |
| 4,964,510 | 10/1990 | Loyd | 206/444 X |

FOREIGN PATENT DOCUMENTS

| | | | |
|---|---|---|---|
| 0308810 | 3/1989 | European Pat. Off. . | |
| 2259855 | 6/1974 | Fed. Rep. of Germany . | |
| 9551 | 5/1908 | United Kingdom | 292/210 |

*Primary Examiner*—Bryon P. Gehman
*Attorney, Agent, or Firm*—Merchant & Gould, Smith, Edell, Welter & Schmidt

[57] ABSTRACT

Safety device for a cassette for a compact disc, a cassette tape or the like, which comprises two hingedly interconnected rectangular cassette halves. The safety device can be mounted on the outside of the cassette encircling the cassette to prevent opening thereof and is provided with a lock member for locking engagement with the cassette, which includes a rotary bolt (22) enclosed in a lock housing (20), to be adjusted between engaged position and disengaged position from the outside of the lock housing. A spring blade (30) of magnet material is provided as a latch member for the rotary bolt, the spring blade being arranged to prevent in a latching position rotation of the rotary bolt from the engaged position and being operable against spring bias by magnetic attraction from the outside of the lock housing from the engaged position unlatching the rotary bolt to allow rotation thereof to the disengaged position.

8 Claims, 3 Drawing Sheets

SAFETY DEVICE FOR CASSETTES

BACKGROUND

The invention relates to a safety device for cassettes and more particularly for such a cassette for a compact disc, a cassette tape (audio and video tape) or the like, which comprises two hingedly interconnected rectangular cassette halves, said safety device being intended for mounting on the outside of the cassette encircling the cassette to prevent opening thereof and being provided with a lock member for locking engagement with the cassette, having magnetically operated latch means.

Safety devices of this type are used in the retail trade for blocking the cassette so that it cannot be easily opened to prevent theft of the compact disc or the cassette tape, or such theft in any case cannot take place without considerable difficulties. Several different embodiments of the safety device have been developed during recent years, and an intense development work is still going on for the purpose of making the device cheap considering the fact that it has to be used in a great number at each shop and thus it is important to keep the total costs at the lowest possible level, to make the device difficult to open and to make the device easy to handle so that the use thereof is not experienced by the sales people as an added inconvenience. In other words an appropriate anti-theft device is one which can be accepted by the shop owner as well as the sales people and provides effective means for preventing or at least substantially reducing theft of such theft-prone goods as compact discs and cassette tapes.

The invention has been proposed as part of this development and in order to satisfy said wants and demands in the best possible manner the safety device of the type referred to above according to the invention has obtained the characteristics of the claims.

BRIEF DESCRIPTION OF THE DRAWINGS

In order to explain the invention in more detail an embodiment thereof will be described below reference being made to the accompanying drawings in which.

DETAILED DESCRIPTION

Figure 1:
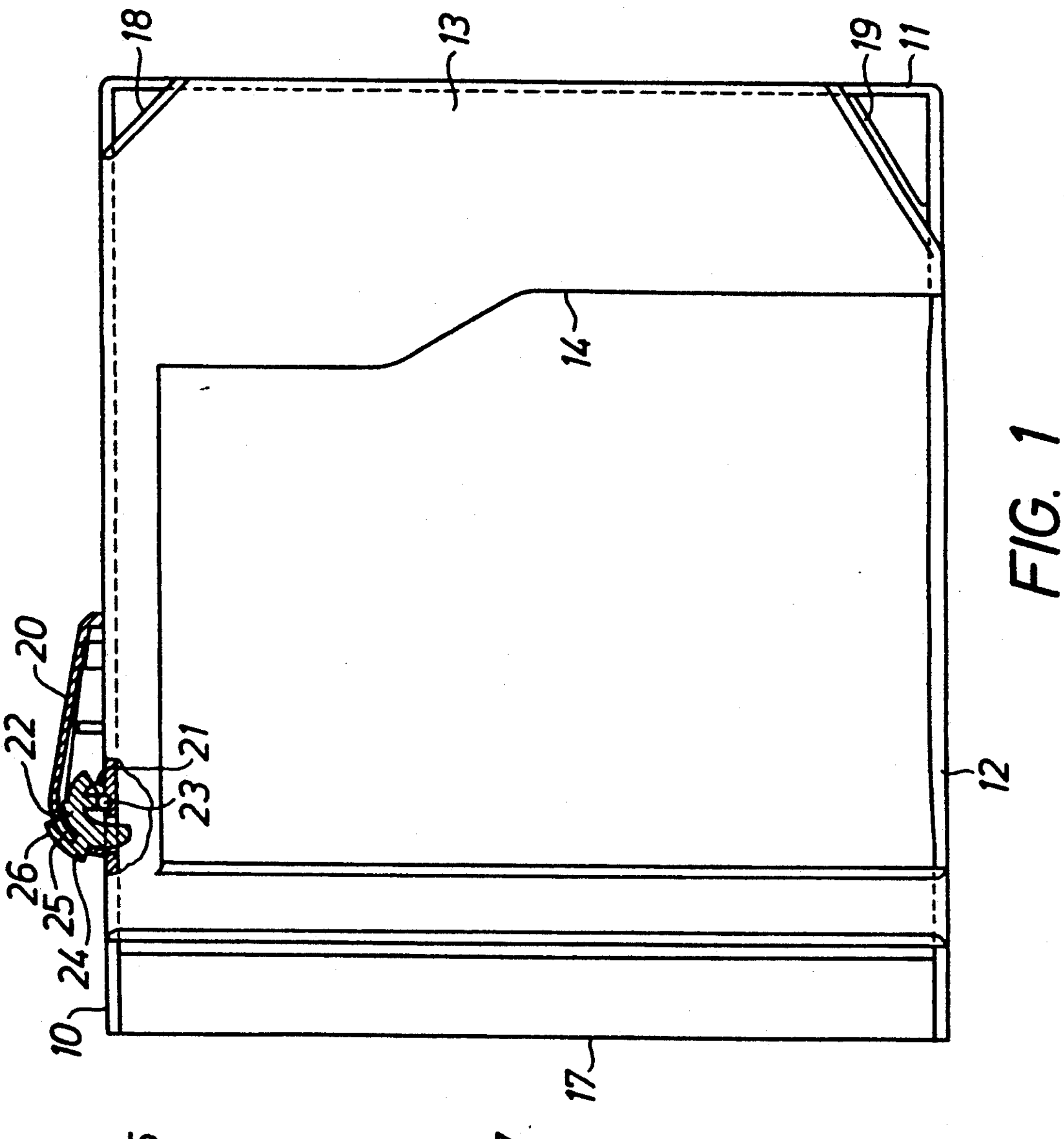
FIG. 1 is a side view, partly a vertical cross-sectional view, of one embodiment of the safety device of the invention.
Figure 3:
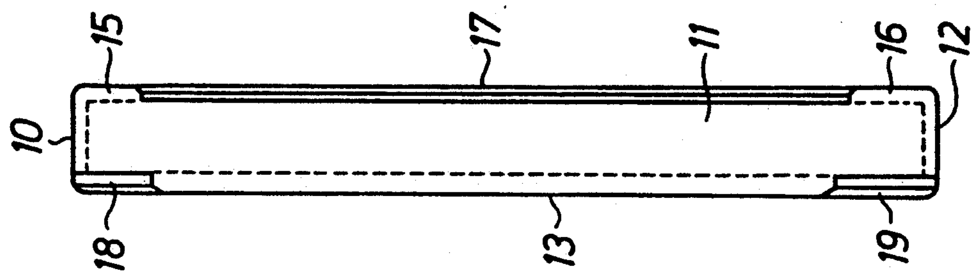
FIG. 3 is an end view of the safety device.

The safety device diclosed in the drawings is intended for a cassette for a compact disc. It is injection molded of plastics material, for example polycarbonate, which is a strong and for the purpose well suited plastics material. Preferably, the plastics material is crystalclear. The device is formed as a flat rectangular frame having three walls 10, 11 and 12 which form narrow sides of the frame, a wall 13 at one flat side of the frame, forming an opening 14, and two triangular corner portions 15 and 16 and a rail 17 at the other flat side of the frame, said triangular corner portions connecting the walls 10, 11 and 11, 12, respectively, the rail 17 being located at the narrow side having no wall. At the open narrow side of the frame the wall 13 is retracted in the longitudinal direction of the walls 10 and 11 in relation to the rail 17 for productional reasons, and for the same reasons apertures 18 and 19 congruent with the corner portions, are provided in the wall 13. The cassette is inserted into the safety device by being pushed into the frame through the open narrow side to the left in FIG. 1. When the cassette is located in the frame it is encircled by the frame along three edges and at the two flat sides by the wall 13 at one flat side and by the corner portions 15 and 16 and the rail 17 at the other flat side.

In order to lock the frame to the cassette there is provided lock means which is enclosed in a lock housing 20 consisting of the same plastics material as the frame and connected to the wall 10 by ultrasound welding or in another manner which provides a homogeneous connection between the frame and the lock housing. The wall 10 forms two slotted lugs 21 spaced in the transverse direction, and a rotary bolt 22 is rotatably mounted at pins 23 in these lugs. The rotary bolt can consist of fiber reinforced hard plastics material or of pressure-molded aluminium so that it is difficult to damage or break the rotary bolt. On a shaft 24 which projects from the rotary bolt through a slot 25 in the lock housing a finger grip 26 is provided said finger grip being available outside the lock housing, and, moreover, two circular curved edge surfaces 27 and 28 are formed by the rotary bolt, said surfaces having the center thereof on the axis of the pins 23. One edge surface 27 has a smaller radius than the other one 28 so that there is provided between the surfaces a shoulder 29. A spring blade 30 of magnet material is clamped at one end thereof between a support 31 formed by the wall 10, and the lock housing and is biassed such that the spring blade at the other free end thereof is kept engaged with the rotary bolt. On the wall 10 there is also provided a spring blade support 32 located between the ends of the spring blade, said support preventing bending of the spring inwardly when the spring is exposed to pressure. However, normally the support does not contact the spring blade.

A cassette for a compact disc usually on one half thereof has two laps for the retention of a printed insert of paper or plastics having a decoration and/or information on the disc in the cassette, and for productional reasons the narrow side of the cassette at each lap forms an aperture. An aperture of this type is utilized in the safety device of the invention for positive engagement between the frame and the rotary bolt by the bolt engaging the aperture when in the position according to FIGS. 1 and 8. In this position of the rotary bolt the free end of the spring blade 30 engages the surface 27 and is located immediately in front of the shoulder 29, which means that the spring blade in this position prevents the rotary bolt from being rotated to disengaged position at the finger grip 26, the rotary bolt being withdrawn from the aperture in the cassette in said position. The frame thus is locked to the cassette and prevents the cassette from being opened for removal of the disc therefrom.

Figure 8:
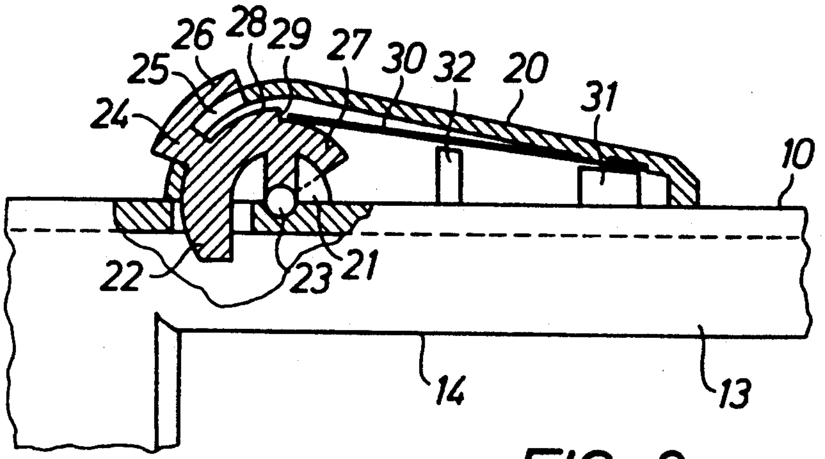
FIG. 8 is a fragmentary vertical cross-sectional view of the lock means when it is in the engaged position.
Figure 9:
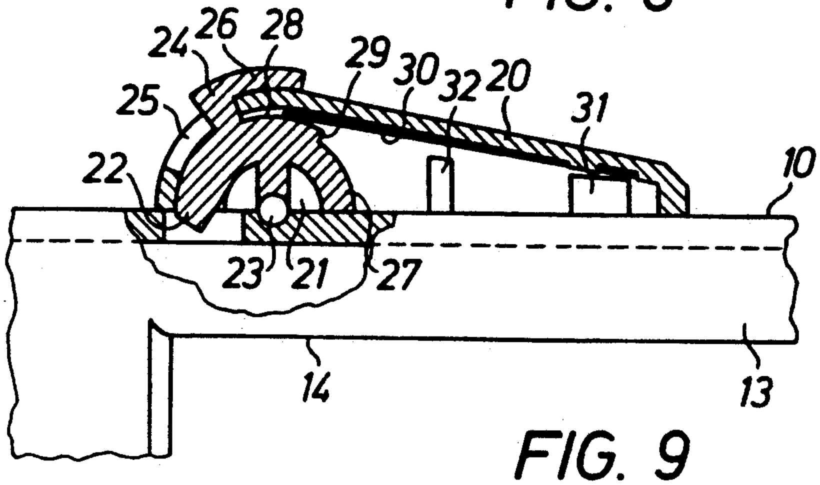
FIG. 9 is a view corresponding to FIG. 8 but shows the lock means in disengaged position.

In order that the rotary bolt can be rotated to the disengaged position the spring blade 30 must be displaced from the shoulder 29, and this is done by attracting the spring blade to a magnet 33 which is advanced towards the lock housing from the outside thereof and thus is brought to the position according to FIG. 9. The spring blade should be so stiff that in the latching position thereof it cannot be bent away when the rotary bolt is operated manually at the finger grip 26, and a very strong electric magnet or a permanent magnet of high-quality magnet material is required in order to bring the spring blade to the position according to FIG. 9; it should not be possible to use any simple permanent magnet for the purpose. In the position according to FIG. 9 the shoulder 29 of the rotary bolt can be rotated to pass by the free end of the spring blade clockwise as seen in FIG. 8 to the position according to FIG. 9 by the rotary bolt being operated manually at the finger grip 26, the rotary bolt being withdrawn from the aperture in the cassette. Then, the cassette is free to be withdrawn from the safety device. This operation should of course be performed by an authorized person only, for example, the shop attendant when the product protected by the safety device is being sold.

In the locking position according to FIG. 8 there should be an insignificant gap between the shoulder 29 and the free end of the spring blade so that the movement of the spring blade to the disengaged position will not be prevented by friction between the blade end and the shoulder.

In order that the rotary bolt can be arrested in the disengaged position and cannot by gravity fall down to the engaged position when the safety device is empty and thus prevent the insertion of the cassette into the safety device, a V-shaped notch 34 is provided on the shaft 24 and a corresponding projection 35 is provided in the boundary surface of the slot 25, said projection engaging the notch when the rotary bolt is in the disengaged position. Alternatively, the rotary bolt can be biased to the disengaged position thereof by a torsion spring. It is also possible to exclude the shaft 24 and the finger grip 26 and to effect the manual operation of the rotary bolt by means of a pin or the like inserted through the slot 25, said pin being inserted into a depression or a hole in the rotary bolt when said bolt is to be adjusted manually.

Instead of engaging said aperture in the cassette, the rotary bolt can be constructed to be located in the engaging position thereof in front of the edge of the cassette inserted into the safety device so that the rotary bolt blocks withdrawal of the cassette from the safety device. However, it is better that the rotary bolt engages the aperture in the cassette because the rotary bolt as a consequence thereof cannot possibly be reached from the outside, which would be the case if the rotary bolt is located outwardly of the cassette.

Figure 2:
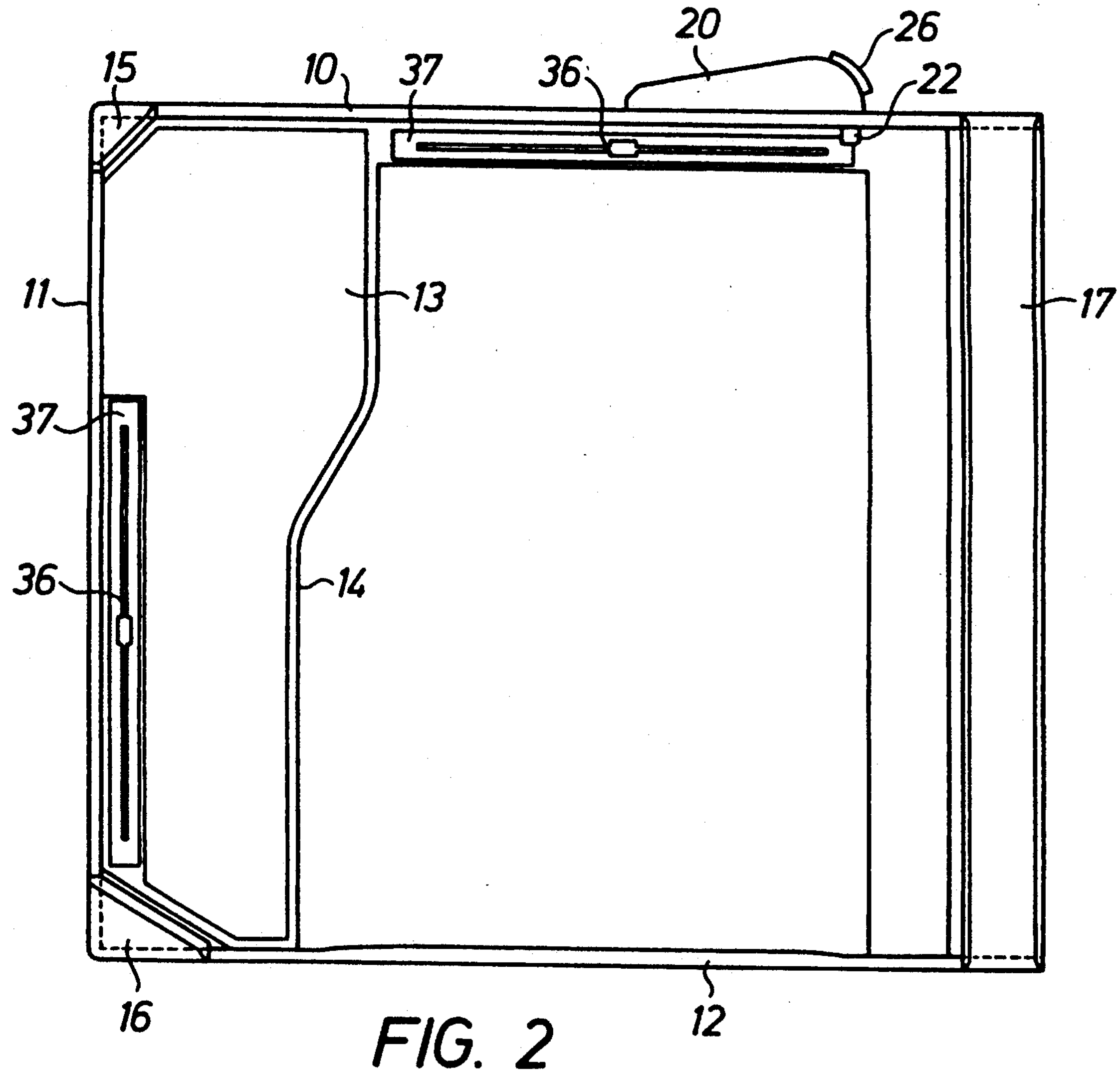
FIG. 2 is a side view of the opposite side of the safety device.
Figure 4:
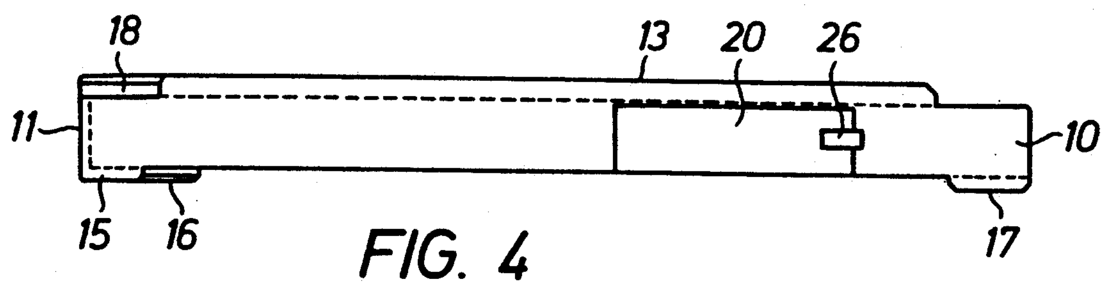
FIG. 4 is a plan view of the safety device.
Figure 5:
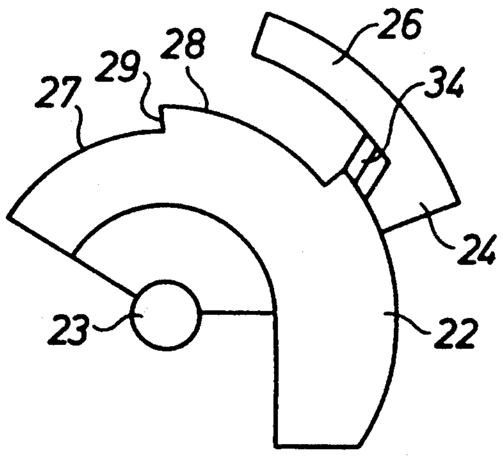
FIG. 5 is a side view of a rotary bolt forming part of the lock means.
Figure 6:
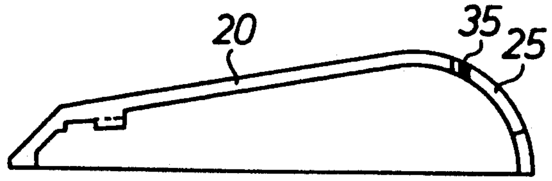
FIG. 6 is a longitudinal cross-sectional view of the lock housing of the lock means.
Figure 7:
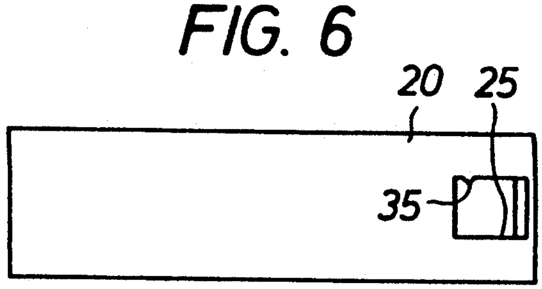
FIG. 7 is a plan view of the lock housing.

In order to provide an effective protection against theft the safety device must be provided with one or more sensors for affecting an electric alarm system, and two sensors of this type are shown in FIG. 2 at 36. They are mounted in depressions 37 on the inner side of the wall 13.

I claim:

1. Safety device for a cassette for a compact disc, or a cassette tape, which cassette comprises two hingedly interconnected rectangular cassette halves, said safety device being intended for mounting on the outside of a said cassette encircling said cassette to prevent opening thereof and being provided with a lock member for locking engagement with said cassette, said safety device having magnetically operated latch means, wherein said lock member comprises a rotary bolt enclosed in a lock housing to be adjusted between an engaged position and a disengaged position from the outside of the lock housing, and that a spring blade of magnet material is provided as a latch member for the rotary bolt, said spring blade being arranged to prevent rotation of the rotary bolt from the engaged latching position and being operable against spring bias from said latching position by magnetic attraction from the outside of the lock housing thereby unlatching the rotary bolt to allow rotation of the rotary bolt to the disengaged position.

2. Safety device as in claim 1 which comprises a frame having flat sides and opposite edges which is adapted to encircle a said cassette at the flat sides and one pair of opposite edges.

3. Safety device as in claim 2 wherein the rotary bolt is arranged to engage one of said edges.

4. Safety device as in claim 2 wherein the spring blade at one end thereof is clamped between the lock housing attached to the frame, and a support provided on the frame.

5. Safety device as in claim 4 wherein the rotary bolt forms a shoulder and wherein the spring blade has a free end, and wherein in the latching position thereof and with the rotary bolt in the engaged position has said free end thereof in front of the shoulder.

6. Safety device as in claim 5 wherein the rotary bolt has two circularly curved surface portions with the center of said portions located on the axis of the rotary bolt, shoulder being located between the surface portions.

7. Safety device as in claim 6 wherein the spring blade is biased to engage the surface portions of the rotary bolt.

8. Lock mechanism comprising a lock member and a magnetically operated latch means for latching said lock member in an engaged position, wherein the lock member comprises a rotary bolt (22) enclosed in a lock housing, said rotary bolt to be rotated between the engaged position and a disengaged position from the outside of the lock housing, and a spring blade of magnet material is provided as a latch member for the rotary bolt, said spring blade being arranged to prevent, in a latching position, rotation of the rotary bolt from the engaged position and being operable against spring bias by magnetic attraction from the outside of the lock housing from said latching position unlatching the rotary bolt to allow rotation thereof to the disengaged position.

* * * * *